United States Patent [19]

Uchida

[11] Patent Number: 4,786,821
[45] Date of Patent: Nov. 22, 1988

[54] COLOR ORIGINAL READING APPARATUS HAVING A KNIFE EDGED REFLECTING BEAM SPLITTER

[75] Inventor: Satoru Uchida, Atsugi, Japan

[73] Assignee: Ricoh Company, Ltd., Tokyo, Japan

[21] Appl. No.: 946,787

[22] Filed: Dec. 29, 1986

[30] Foreign Application Priority Data

Dec. 28, 1985 [JP] Japan ............................... 60-293614

[51] Int. Cl.$^4$ ............................................. H01J 40/14
[52] U.S. Cl. ...................................... 250/578; 358/75
[58] Field of Search ..................... 250/216, 578, 201; 350/169, 171, 172; 358/75

[56] References Cited

U.S. PATENT DOCUMENTS

| 4,531,054 | 7/1985 | Suzuki ................................. 250/201 |
| 4,580,060 | 4/1986 | Takashi ............................... 250/578 |

FOREIGN PATENT DOCUMENTS

| 0098048 | 1/1984 | European Pat. Off. ............ 350/171 |
| 0105669 | 6/1983 | Japan ..................................... 358/75 |
| 0253366 | 12/1985 | Japan ..................................... 358/75 |

*Primary Examiner*—David C. Nelms
*Assistant Examiner*—Jessica Ruoff
*Attorney, Agent, or Firm*—Oblon, Fisher, Spivak, McClelland & Maier

[57] ABSTRACT

A color original reading apparatus includes a focusing lens which receives a light beam containing image information and reflecting from an original document to be read and outputs a convergent light beam toward a first line image sensor. A first color separating lens is disposed in front of the first image sensor so that only a first predetermined color component of the light beam is allowed to impinge on the first image sensor. A reflecting mirror having a reflecting surface at its forward side surface and a knife edge at its forward end surface is disposed to reflect part of the convergent light beam toward a second line image sensor. The reflecting mirror is disposed not to cross the optical axis of the convergent light beam. In addition, the angle defined by the knife edge is set to be smaller than the angle defined between the reflecting surface and the optical axis. A second color separating filter is disposed in front of the second image sensor so that only a predetermined second color component of said reflected part of said convergent light beam is allowed to reach the second image sensor.

4 Claims, 3 Drawing Sheets

F I G. 1
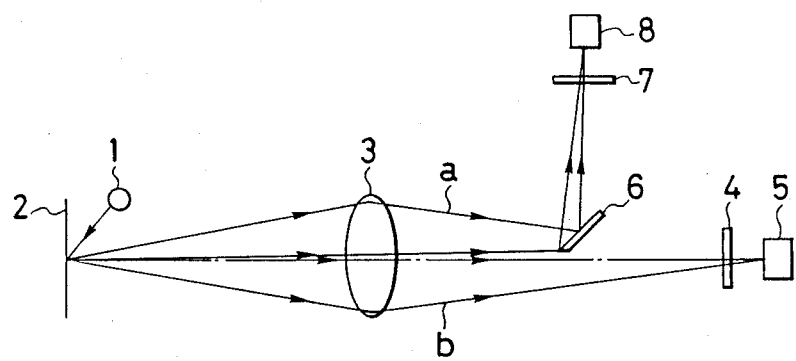
F I G. 2a
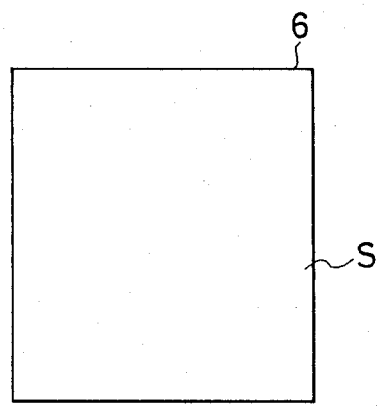
F I G. 2b
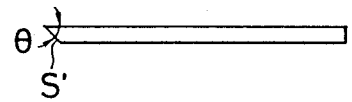

COLOR ORIGINAL READING APPARATUS HAVING A KNIFE EDGED REFLECTING BEAM SPLITTER

BACKGROUND OF THE INVENTION

1. Field of the Invention

This invention generally relates to a reading apparatus for optically reading an oiginal document, and, in particular, to a color original reading apparatus for reading a color original using a plurality of line sensors.

2. Description of the Prior Art

In a typical prior art system for optically reading a color original, light having image information reflecting from the color original, which is illuminated by a light source, is passed through a focusing lens and the light is then separated into two or more beams which are passed through respective color filters before impinging on respective image sensors. In the system of this type, there are those which use a dichroic mirror or dichroic prism having a characteristic of reflecting light of a particular color component and allowing the light of the other color components to pass therethrough, in which case the light having image information is subjected to beam splitting and color separation at the same time, and there are those which use a half mirror for splitting the light beam into two light beams and a color separation filter for each of the split light beams for allowing light of a particular color component to pass therethrough.

However, with such a structure, when the light having image information and being convergent after passing through the focusing lens is passed through the above-described mirror or prism, the degree of astigmatism increases so that the image formed on a line image sensor tends to be defocused. For this reason, in order to obtain a focused image of high quality, it is required to use a focusing lens having a characteristic to compensate for the astigmatism due to the provision of the above-described mirror or prism. In addition, such components as dichroic mirrors and prisms and half-mirrors are relatively expensive, so that the prior art systems tend to become high at cost.

SUMMARY OF THE INVENTION

In accordance with the principle of the present invention, there is provided a knife edge as a means for splitting a light beam having image information into two light beams. In the preferred embodiment, a knife edge is so disposed with its tip end located in a convergent light beam having image information after passing through a focusing lens and the knife edge does not extend across the optical axis of the convergent light beam. Each of the split light beams is then passed through a color separation filter thereby allowing a particular color component light beam to pass therethrough before impingement upon a line image sensor.

It is therefore a primary object of the present invention to obviate the disadvantages of the prior art as described above and to provide an improved light beam splitting apparatus.

Another object of the present invention is to provide a color original reading apparatus high in performance and low at cost.

A further object of the present invention is to provide a color original reading apparatus using a knife edge as a means for splitting a light beam having image information into two or more light beams.

Other objects, advantages and novel features of the present invention will become apparent from the following detailed description of the invention when considered in conjunction with the accompanying drawings.

BRIEF DESCRIPTION OF THE DRAWINGS

FIG. 1 is schematic illustration showing a color original reading apparatus constructed in accordance with one embodiment of the present invention;

FIG. 2a is a plan view of the reflecting mirror 6 serving as a beam splitter provided in the apparatus shown in FIG. 1;

FIG. 2b is a side elevational view of the reflecting mirror 6 shown in FIG. 2a;

DESCRIPTION OF THE PREFERRED EMBODIMENTS

Figure 3:
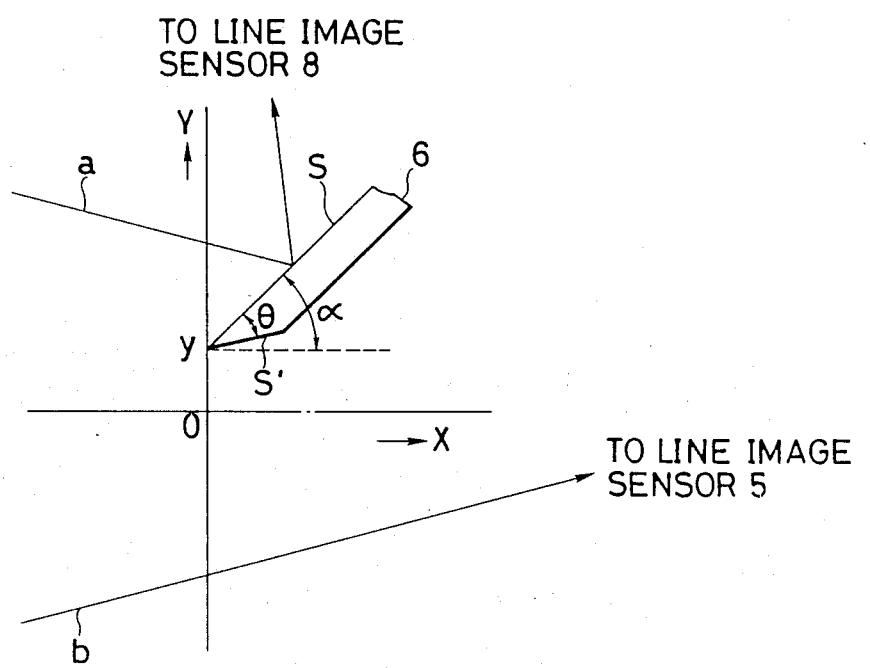
FIG. 3 is an illustration showing in detail the mounting condition of the reflecting mirror 6.

Referring now to FIG. 1, there is schematically shown a color original reading apparatus constructed in accordance with one embodiment of the present invention. As shown, the present reading apparatus includes a light source 1 for illuminating an original document 2 to be optically read. In the present embodiment, the original document 2 is supposed to have a multi-color original image thereon. Also provided in the present apparatus is a focusing lens 3 for collecting the light reflecting from the original document 2 and thus having image information thereof, and the light passing through the focusing lens 3 is convergent toward its focusing point at which a first line image sensor 5 is disposed. A first color separation filter 4 is disposed in front of the first line image sensor 5 so that only the light of particular color component is allowed to pass therethrough and then to impinge on the first line image sensor 5. A reflecting mirror 6 is disposed between the focusing lens 3 and the first color separation filter 4 such that it reflects approximately half of the light passing through the focusing lens 3 to be directed toward a second line image sensor 8. Thus, the reflecting mirror 6, in effect, serves as a beam splitter. A second color separation filter 7 is disposed in front of the second line image sensor 8. Thus, the light received by the first line image sensor 5 is also approximately half of the light passing through the focusing lens 3.

With this structure, the light passing through the focusing lens 3 has multiple colors, but the light passing through each of the color separation filters 4 and 7 has image information of a particular color component determined by the color separation characteristic of each of the color separation filters 4 and 7. In addition, the reflecting mirror 6 has a knife edge at its forward end and the reflecting mirror 6 is so disposed to reflect part of the light from the focusing lens 3 to be directed toward the second line image sensor 8 and not to intersect the optical axis defined by the convergent light from the focusing lens 3 or by the focusing lens 3 by itself. Thus, the amount of light directed toward the second line image sensor 8 by the reflecting mirror 6 is substantially equal to or less than the amount of light directed to the first line image sensor 5 from the focusing lens 3.

The overall structure of the reflecting mirror 6 is shown in FIGS. 2a and 2b. As shown in FIG. 2a, the reflecting mirror 6 has a generally rectangular reflecting surface S one side of which defines a tip end of a knife edge which in turn is defined by the reflecting surface S and an inclined end surface S', so that the knife edge has an angle defined between the reflecting surface S and the inclined end surface S'. The arrangement of the reflecting mirror 6 and more particularly the knife edge of the reflecting mirror 6 with respect to the convergent light from the focusing light 3 is shown in detail in FIG. 3. That is, in FIG. 3, the top and bottom peripheries of the convergent light beam from the focusing lens 3 are indicated by a and b, respectively, and the optical axis of the convergent light beam or the focusing lens 3 itself is indicated by X. A vertical line normal to the optical axis X and passing through the tip end of the knife edge of the reflecting mirror 6 is indicated by Y, and the location of the tip end of the reflecting mirror 6 in the Y axis is indicated by y and the intersection between the X and Y axes is defined as the origin of the X-Y coordinate system.

Under the above-described conditions, in accordance with the principle of the present invention, the tip end of the knife edge of the reflecting mirror 6 is located to satisfy the conditions that y is larger than 0 in the X-Y coordinate system. In other words, the reflecting mirror 6 is so disposed to intersect part of the convergent light beam from the focusing lens 3 but not to intersect the center optical axis X of the convergent light. In addition, the reflecting mirror 6 is so disposed that its reflecting surface S can reflect part of the convergent light beam from the focusing lens 3 to be directed toward the second line image sensor 8. Furthermore, the reflecting mirror 6 is so inclined with respect to the optical axis X that the angle alpha defined between the reflecting surface S and the optical axis X is larger than the angle θ defined between the reflecting surface S and the inclined end surface S'.

Figure 4:
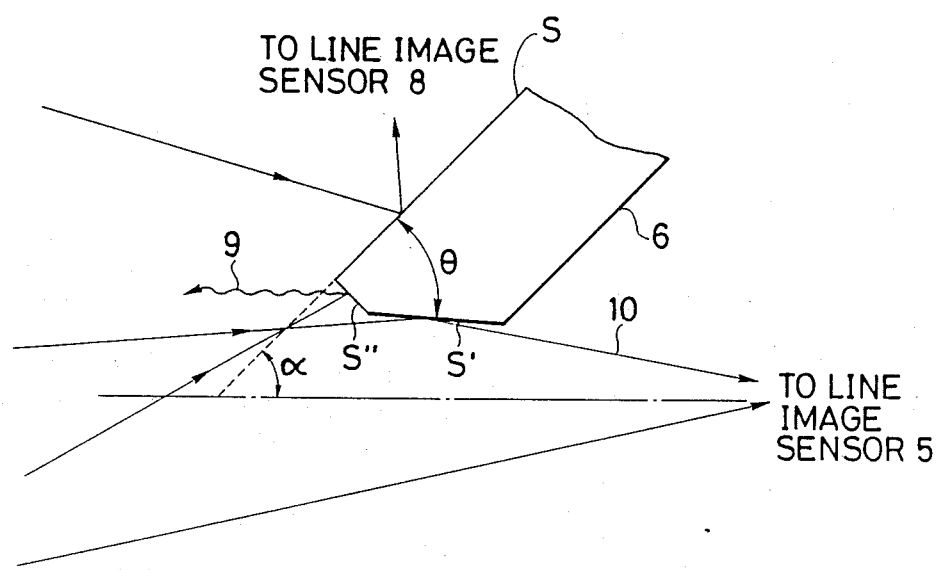
FIG. 4 is an illustration which is useful for explaining the production of flare.

It will be described why the reflecting mirror 6 is so structured and arranged as described above. For this purpose, it will be considered the case in which a cut surface S" is formed at the tip end of the reflecting mirror 6 and the angle defined between the reflecting surface S and the inclined end surface S' is larger than the angle alpha defined between the reflecting surface S and the optical axis X, as shown in FIG. 4. In this case, since part of the convergent light from the focusing lens 3 is incident upon the cut surface S", that part of the light impinging on the cut surface S" will be scattered if there are irregularities on the cut surface S". And, part of this scattered light may return toward the focusing lens 3 as indicated by the wavy line 9, and this returning light is then reflected at the surface of the focusing lens 3 to be lead into the first line image sensor 5, thereby producing flare. In addition, there is a chance that part of the convergent light from the focusing lens 3 is reflected by the inclined end surface S' to be incident upon the first line image sensor 5, thereby producing flare. This is disadvantageous because the boundary between light and dark portions in the original image become obscure and the information of fine lines may be lost.

In order to eliminate such disadvantages, in accordance with the principle of the present invention, a knife edge is defined at the forward tip end of the reflecting mirror 6 without any cut surface, such as the one indicated by S", and it is so structured that the angle defined between the reflecting surface S and the inclined end surface S' is smaller than the angle alpha defined between the reflecting surface S and the optical axis X. With this structure, there will not be produced such unwanted reflected light as those indicated by 9 and 10 in FIG. 4, thereby allowing to prevent flare from being produced by the light incident upon the first line image sensor 5.

Returning to FIG. 3, as the distance y between the origin of the hypothetical X-Y coordinate system and the tip end of the reflecting mirror 6 is made smaller, the amount of light received by the first line image sensor 5 decreases and the amount of light received by the second line image sensor 8 increases. And, thus, the ratio of an output level of image signals output from the first and second line image sensors 5 and 8 can be properly adjusted by adjusting the distance. However, a diffraction phenomenon may take place at the tip end of the reflecting mirror 6, which could deteriorate the resolution in a manner similar to the above-described flare problem. It has been experimentally determined by the present inventor that the resolution could deteriorate significantly if the reflecting mirror 6 were located to cross the optical axis X, i.e., the distance y being negative in value. It has been observed that the information of a fine line could be lost if the effect of diffraction were significant. As a result, it has been determined that the reflecting mirror 6 should be so located not to cross the optical axis X of the convergent light from the focusing lens 3. It should be noted that the optical axis X is also an optical axis of the focusing lens 3 itself in the illustrated embodiment. Thus, the distance should be positive in value.

As described above, in accordance with the present invention, the forward end of the reflecting mirror 6 is formed with a knife edge having an acute angle so as to prevent the production of flare at the first line image sensor 5, and the reflecting mirror 6 is so disposed not to cross the optical axis of the convergent light toward the first line image sensor 5 so as to keep the effect of diffraction as small as possible. With this structure, there is no need to provide such an expensive component as a dichroic mirror or prism or a half-mirror. Besides, the focusing lens 3 may be of the ordinary conventional one and there is no need to provide any extra component for carrying out further compensation or correction. Furthermore, the reflecting mirror 6 is relatively simple in structure and thus it can be manufactured at low cost.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims. For example, in the above-described embodiment, only one reflecting mirror having a knife edge is disposed to split the convergent beam into two beams; however, two or more such reflecting mirrors can also be disposed to reflect part of the convergent light beam. In the case where two such reflecting mirrors are disposed to split the convergent light beam into three beams, each for one of the three primary colors, the present color original reading apparatus can be applied to a full-color processing operation.

What is claimed is:

1. A color original reading apparatus comprising:

means for receiving a light beam reflecting from an original image to be read and outputting said light beam to be convergent in a first direction;

reflecting means disposed in said convergent light beam so as to direct part of said convergent light beam in a second direction which is different from said first direction, said reflecting means being so disposed not to cross an optical axis of said convergent light beam directed in said first direction;

a pair of first and second image sensors disposed to receive a first portion of said convergent light beam which is not reflected by said reflecting means and a second portion of said convergent light beam which is reflected by said reflecting means, respectively; and a pair of first and second color separating filters disposed to receive said first and second portions of said light beam, respectively, to pass respective predetermined color components thereof.

2. The apparatus of claim 1 wherein said reflecting means includes a generally plate-shaped reflecting mirror having a reflecting surface at a forward side thereof and a knife edge at a forward end thereof, said reflecting mirror is so disposed to define a first predetermined angle between said reflecting surface and said optical axis.

3. The apparatus of claim 2 wherein said knife edge is formed by said reflecting surface and an inclined forward end surface of said reflecting mirror to define a second predetermined angle which is smaller than said first predetermined angle.

4. The apparatus of claim 1 wherein said means for receiving includes a focusing lens whose optical axis defines said optical axis of said convergent light beam.

* * * * *